United States Patent [19]

Sundén

[11] 4,033,913
[45] July 5, 1977

[54] CELLULOSE AND CELLULOSE PRODUCTS MODIFIED BY SILICIC ACID

[76] Inventor: Olof Sundén, 22 Snickarvagen, S 181 46 Lidingo, Sweden

[22] Filed: May 16, 1975

[21] Appl. No.: 578,043

[52] U.S. Cl. .................................. 260/17 R; 260/9; 260/13; 260/17.4 CL
[51] Int. Cl.² ........................................... C08L 1/10
[58] Field of Search ............. 260/17.4 CL, 17 R, 9, 260/13

[56] References Cited

UNITED STATES PATENTS

| | | | |
|---|---|---|---|
| 2,549,563 | 4/1951 | Barnstead | 106/81 |
| 2,703,289 | 3/1955 | Willson | 106/93 |

OTHER PUBLICATIONS

Chem. Absts. 51(1966) 10793g, "Wood Fibers of Low Flammability", Thaler.
Chem. Absts. 61(10863g), "Treatment - - Cellulosic - - Cements, Garnier.
Chem. Abstrs. 71(1969), 104884g, "Lightweight Shaped Construction Material", Terunuma.
Chem. Abstrs. 72(1970), 122421v, "Filler for Extending Polymer Materials", Macovstra.

*Primary Examiner*—Edward M. Woodberry
*Attorney, Agent, or Firm*—A. Yates Dowell, Jr.

[57] ABSTRACT

A method for modifying the physical characteristics of cellulose materials by the impregnation of the cellulose fibers with acidic solutions of monomer and oligomeric silicic acid to form a capillary cellulose-polysilicic acid structure to which selective binder materials may be adhered.

15 Claims, No Drawings

CELLULOSE AND CELLULOSE PRODUCTS MODIFIED BY SILICIC ACID

The present invention relates to cellulose and cellulosic products modified by silicic acid. The invention further relates to products containing silicic acid modified cellulose in which the increased bonding power and the increased surface area are utilized in papers, non-woven materials, reinforced plastics and reinforced cement products of the "eternite" type. By the modification, the cellulose fibers are increased in strength, especially under wet conditions, and the hydrogen bonding between the fibers themselves, as well as between the fibers and other added binder materials like plastics and concrete or cement, is increased.

It is well known that properties like friction can be improved in papers and textiles by adding silica powders or emulsions containing solid silicic acid particles with an average diameter of 10–1000 nanometers. Trademarks of such solid silica powders are Aerosil (Degussa), Ludox water suspensions (Du Pont) and Syton water suspension (Monsanto). However, commercial silica of any type is not useful for the purpose of this invention and does not give the cellulose modification according to the invention. Neither do soluble silicates like orthosilicates, metasilicates or water glass give the properties specific to the invention.

The silicic acids used for the purpose of the invention are water of colloidal soluble monomers and oligomers of silicic acid, prepared by a fast neutralization and acidification of alkali silicate solutions, preferably water glass solutions. Such solutions are not stable for more than a few hours and must be brought into contact with the cellulose within that time in order to develop the desired cellulose modification.

Solutions of silicic acid monomer and oligomers must be kept at low pH 1–3 and preferably at temperatures below 30° C in order not to polymerize to form solid gels. Solutions can be prepared with concentrations up to 150 g $SiO_2$ per liter, and such solutions can be handled for some hours under the above given conditions.

The reactivity of these silicic acid solutions against various organic products are rather unknown. However, the U.S. Pat. No. 2,399,981 to Scott Paper Co (1946) describes how a limited wet strength of paper can be achieved by impregnation with such silicic acid solutions and drying. According to the Scott patent very brittle papers having too low a dry tear strength will be developed if more than 8% $SiO_2$ is incorporated in the paper. Another drawback in such processes is that the salt formed during neutralization of the water glass will be incorporated in the paper.

According to the present invention papers with up to 40% or even 50% $SiO_2$ (calculated on the original weight of paper) can be achieved with improved dry tear strength, and depending on reaction conditions, greater wet strengths can be achieved. In extreme cases wet strengths of 20,000 m have been measured and for regular purposes wet strengths of 3,000 to 5,000 m are achieved. Papers of technical use may contain between 2 and 100% silicic acid as $SiO_2$ based on weight of cellulose but for wet filter purposes, $SiO_2$ contents of 8–40% are preferable. Beside the increased wet strength and good tear strength such papers also show increased stiffness and improved chemical resistance, and thus may replace asbestos sheets for many purposes such as filters for corrosive and oxidative liquids. Such papers are also well suited for food packaging because of their wet strength, wet stiffness and lack of harmful products such as formaldehyde. Due to the open structure, achieved also in case of high $SiO_2$ contents, the paper products are especially useful as air filters and in an humidification. If formed wet, the structure will be permanented during drying.

In the process of modification a cellulose paper with silicic acid a solution of monomer-oligomer silicic acid is initially produced either by rapid neutralization of a water glass solution by a strong cation exchanger, which absorbs the sodium ions of the waterglass, or by the addition of a waterglass solution to a 4–5 normal sulphuric acid, followed by crystallization and separation of the sodium sulphate formed. The silicic acid solution should be kept at a pH of 1–5, preferably between 1.5 and 3.0. The paper is then impregnated at this pH with the practically salt free silicic acid solution and dried. Depending on the concentration of the silicic acid and the conditions during drying varying degrees of increased wet strength will be developed, dependent upon the degree of modification.

The present invention is based on the fundamental discovery that soluble monomers and oligomers of silicic acid may react in two competitive ways when brought in contact with cellulose. The first and undesired reaction is equivalent to uncontrolled polycondensation of the monomers and oligomers to a silica gel. The second and desired reaction includes two steps, one of orientation of the monomers and oligomers to the cellulose molecules by hydrogen bonding forces, and another of polycondensation of the oriented monomers and oligomers with one another and possibly also with the cellulose. The first uncontrolled polycondensation is favoured by pH of 5–10, and results in silica of low cofillarity of or BET surfaces generally below 100 m²/g, while the second oriented polycondensation is favored by acidic conditions or pHs between 1 and 3 and yields polysilicic acids with capillary surfaces of 200–800 m²/g. The second reaction is further promoted by the presence of small amounts of polyvalent acids with p K-values between 2 and 6, such as tartaric acid and citric acid. These acids and their acidic salts form yellow complexes with monomers and oligomers of silicic acid, which probably decreases the speed of uncontrolled polycondensation.

The two different reactions can be visualized in the following way: A solution of silicic acid monomers and oligomers is prepared by rapid neturalization of a waterglass solution in sulphuric acid to a final pH of 2.0. Then a small amount of tartaric acid is added, corresponding to 2% of the sulphuric acid molar base. After further addition of waterglass to raise the pH to 2.3 the solution becomes bright yellow, and the sodium sulphate is crystallized and may be filtered off at −1° C. The solution is then separated in two parts, one of which is used for impregnation of a soft paper sheet (laboratory filter paper) and the other is poured on an evaporation glass. Both parts are subsequently put into a heating chamber for dyring. As a result, one finds that the silicic acid soaked up in the paper sheet remains as a solution and can be washed out in water, long after the pure silicic acid sample has gelled to a water insoluble gel. By weighing the samples when the water has evaporated from the paper one can further find that the silicic acid is still watersoluble to such a degree that the concentration of the silicic acid should be 700 g $SiO_2$ per liter residual water. By comparison, in the water solution poured on the evaporation glass the silicic acid is gelled at a concentration corresponding to less than 200 g $SiO_2$ per liter. Upon further drying the cellulose oriented silicic acid in the sheet polycondensates to a dry cellulose-silicic acid structure with a BET-surface of 200–600 $m^2/g$, in which the cellulose fibers have formed permanent and water resistent bonds. This bonding gives the paper a high degree of wet strength, which is surprisingly not developed until final drying of which time the capillary structure is opened and the residual silicic acid polymerized therein.

The degree of wet strength, developed, is dependent on pH and the presence of other compounds forming complexes with the silicic acid. Unfortunately, if dried at low pH, the cellulose will be hydrolyzed and will contribute to produce brittle paper. To some extent this drawback can be overcome by the use of buffering acids with pK between 2 and 6 as stated above. In the presence of such acids the pH is kept rather constant during drying and does not decrease below 2, as in the case when strong acids like hydrochloric or sulphuric are present alone. But according to the invention even more efficient regulators have been found. Some complex acids of acidic sulphites and aceton or other ketones and aldehydes not only have the desired pK-value between 2 and 6, they furthermore have the property of keeping a low pH between 1.5 and 3.0 as long as the paper is wet, and yet when the paper starts to be dry, and the risk of hydrolizing the cellulose increases, these acids decompose and leave a less acidic residual, not harmful to the cellulose. Therefore, one of the features of this invention is the use of small amounts of acids with pK between 2 and 6 which are decomposable upon final drying into less acidic residuals, giving the paper a pH of 4–6 in the final dry state.

However, silicic acid modified cellulose is of interest mainly for other applications than wet strength paper. In fact cellulose modified with silicic acid shows new properties making it especially useful in combination with other binding materials in products like non-wovens, reinforced plastics and reinforced cement products. For these applications the cellulose structures have to be impregnated with the solution of monomeric - oligomeric silicic acid under the same acidic conditions as above acid should be polycondensated. In most cases it is best to add the other binder, for instance plastic emulsions or cement paste before final drying of the impregnated cellulose. According to my investigations, this can be explained in the following way. When monomers and oligomers of silicic acid polycondensate are placed in presence of water, a large amount of water is incorporated and bound by hydrogen forces in the hydrated silica gel formed. Later as the water evaporates the silica gel shrinks a capillary structure of molecular dimension is formed having a very large internal surface. The lower the pH and the more the silicic acid oligomers are oriented towards the cellulose or other surfaces, the greater the internal surface, as measured with the BET-method. If such a silicic acid structure is dried it still has a large surface of 500 $m^2/g$ or more, but the "dry" capillaries are too narrow to allow for penetration of added binders such as plastics or cement paste. If these binders are added before drying, however, they can penetrate the silicic acid structure as the included water is evaporated from the structure during drying. It is even possible to observe in a common microscope how some plastics can be sucked up by such a silica gel structure during its drying. According to mathematic calculations the suction "power" of the capillarity in question can be calculated to be equal to 10,000 atmospheres of pressure and even more. In this way the silicic acid bond to the cellulose by hydrogen bonds will function as a large and efficient binding medium between the cellulose fibers and other added binders.

Other binders, which may be used in connection with cellulose or mineral fibers are alkaline, like cement, or slightly acidic, like many plastic and rubber emulsions. When such binders are used in combination with silicic acid modified cellulose, there is little or no risk of hydrolytic decomposition of the cellulose during the final drying, therefore the complex and decomposible acids for controlling the pH can be omitted. It is necessary, however, to bring the solution of silicic acid monomer and oligomers in contact with the cellulose under acidic conditions before the silicic acid is polycondensated to a viscous colloidal suspension or s semisolid gel. The polycondensation must be performed in presence of cellulose to a fixed insoluble structure.

Treatment of cellulose pulp with silicic acid is similar to that of paper treatment. The pulp is impregnated with a solution of silicic acid monomer and oligomers at a pH below 5 and preferably between 1.5 and 3.0. The solution may contain up to 125 possibly 150 g $SiO_2$ per liter. AS the pulp can easily absorb 2–2.5 times its own weight in water, it is possible to produce modified cellulose with $SiO_2$ present in various amounts up to approximately 40% to about 40% in one step. A part of the water can then be evaporated, but if the cellulose has to be mixed with binders like latices or cement paste, this mixing operation should be done before final drying. It is also important that the silicic acid be given enough time not only to orient towards the cellulose but also to polycondensate to a structure insoluble in water and permanently combined with the cellulose. Such a process will take 24–48 hours at pH 1.5–2.0 at ambient temperature and less time at higher pH and temperature. Another reason for not completely drying the silicic acid impregnated pulp is that the dry fibers will be fixed permanently to each other which makes desintegration of the pulp very difficult. Even without drying the desintegration of the pump will require more time and power than regular cellulose.

All types of cellulose can be modified according to this invention, sulphite cellulose, sulphate craft cellulose, semi-chemical pulps as well as mechanical pulps. Bleached and unbleached pulps and papers are equally fitted for modification. Again, various types of latex muffer materials and plastic can be used as additional binder.

When it is desired to use non-woven materials, a stock is prepared of silicic acid modified cellulose including some short rayon fibers (1$d$ tex 10 mm) which should be mixed with latex binders at the wet end. Such silicic acid modified stocks give a very soft textile like product with surprisingly high strength and tear strength. When regular cellulose is used, wet end addition of latices is generally less effective than a separate aftertreatment with the lactices. Various types of latices can be used, for instance acrylate latices, polyvinylacetate latices, styrene-butadien latices, nitrile latices etc.

When using reinforcing fibers in plastics and cement products, the wet end mixing seems to be the most suitable. A pulp stock is made of the modified cellulose and a plastic or rubber latex is added but in larger amounts than in the case of non-woven. For non-woven materials 20–30% solids of the modified fiber weight is sufficient. However, when reinforced plastics are concerned the amount of solid plastics added as latex is several times the amount of modified cellulose. When used in combination with cement or other hydraulic binders, the cement is added to the desintegrated pulp stock and the surplus water filtered off and the cement allowed to cure. Also, in this case, the amount of cement should be several times the amount of cellulose, preferably 5–10 times. When adding latex to reinforced plastics, the added latex has to be coagulated and the coagulated product including modified cellulose has to be separated from water, dried and processed by pressing or injection molding.

EXAMPLES

EXAMPLE 1

Monomer-oligomer silicic acid ws produced by adding a waterglass solution (ratio $SiO_2:Na_2O=3.2$) of a concentration corresponding to 13% by weight $SiO_2$ to 5N hydrochloric acid until the pH was 1.8. The resulting solution had a concentration corresponding to 105 g $SiO_2$ per liter.

A filter paper (laboratory filter of sulphite pump) was saturated with this solution, corresponding to 24 g $SiO_2$/100 g paper. The saturated paper was dried at 80° C. A pH-indicator showed that the pH decreased during drying, and when the paper was dry, it indicated a pH below 1.0. The paper smelled unpleasant of HCl. After drying the paper was very stiff and brittle. It was washed free of soluble impurities, and after a second drying it showed a weight increase of 25%, corresponding to 25 g silicic acid ($SiO_2$) per 100 g cellulose. The wet strength of the paper was good, corresponding to 3,000 m or 12 times that of the original paper. The brittleness was very high, however. Folding endurance could not be measured (less than 10 foldings) and the dry tear strength had decreased to 40% of the original. Even in the wet state the paper was too stiff to be used and folded for filter purposes.

In order to reduce degradation of cellulose by a low pH, the pH of the silicic acid solution was increased to 3.1 by adding 0.5N sodium hydroxide under intensive agitation. Only 13 ml/l was required. Now the silicic acid solution showed a very short gelling time of only 20 minutes. Another filter paper of the same type as above was impregnated and dried at 80° C before the solution gelled, however. During the drying process, a silica gel was formed on the surface of the paper. The dried paper had a pH of 2.5, it was not brittle, but the silica could be dislodged together with some sodium chloride. During washing the paper showed a very low wet strength, only about 2 times that of the original paper. Dry tear strength was unaltered. The silicic acid had modified the paper to a very small degree.

EXAMPLE 2

Monomer-oligomer silicic acid was produced by adding 1 liter waterglass solution with 180 g $SiO_2$ per liter to cold 5N sulphuric acid during intensive agitation. The volume of sulphuric acid was 400 ml. The finished solution was quite clear, had a pH of 2.2 and a concentration of 130 g/l $SiO_2$. In order to remove the sodium sulphate, 15 ml aceton was added and the solution cooled to −1.5° C. The precipitated sodium sulphate was filtered off. 1.1 liter clear silicic acid solution was achieved with a concentration of 150 g/l $SiO_2$, about 20 g/l $Na_2SO_4$ and a pH of 2.2.

A. A filter paper was impregnated with this solution and dried. The increase of weight was 34%, of which 2% could be washed out (sodium sulphate). The dried paper contained consequently around 32% $SiO_2$ and the colour of the pH-indicator dropped on the paper indicated a pH of 1.5–2.0 after drying. The paper had a good wet strength of close to 3,000 m, 11 times that of the original paper. Stiffness had increased but dry tear strength was only slightly reduced. Folding endurance was still low, but better than the first part of example 1.

B. To another part of the solution tartaric acid was added in an amount corresponding to 1.5 g/100 ml and diluted waterglass added to bring the pH to 3.0. During this operation a strong yellow colour was developed in the silicic acid solution, which also had been diluted to a silicic acid concentration of 125 g/l $SiO_2$. The solution was used for impregnation of the filter paper. During the drying operation the pH of the paper decreased from 3.0–3.5 down to 2.5 in the final dry state. The paper had combined with 27% silicic acid as $SiO_2$. It had a wet strength of 2,700 m or 10–11 times that of the original paper. The paper was stiffer than the original, but showed a 10% increase in dry tear strength. Folding endurance was about 50% of the original.

C. To a third part of the solution, there was added a 3 g/100 ml of sodium-pyrosulphite in a concentration solution. This reacted with the aceton added before separation of sodium sulphate. The pH of the solution was finally adjusted to 2.0 with a few drops of 5N sulphuric acid, and the solution was used for impregnation of filter paper.

The pH was kept constant between 2.0 and 2.5 during the main part of the drying process. There were no signs of a gel formation on the surface. When the moisture content had decreased about 80%, the pH slowly increased to 2.5–3.0. The paper still was quite soft. It stiffened, however, and the pH rapidly changed to 5.0. After that point no further loss of weight was noticed.

The paper achieved had absorbed about 35% $SiO_2$ on cellulose bases. The wet strength was 4.600 m or about 19 times the original. Wet and dry stiffness were very much improved. The most surprising result was that dry tear strength was improved by 50–60%. Folding endurance was high with respect to the stiffness, being decreased to 80% of the original however the paper was much softer.

This very efficient impregnation solution was used for various papers such as sulphate papers, craft papers, printing papers both with and without mechanical pulp. All showed extreme good results. The best results were obtained with papers which were very absorbent. In some cases wet strengths of 12.000 m were achieved and even 15.800–18.000 for papers saturated two times with the silicic acid solution. Papers containing mechanical pulp turned out to be more brittle than corresponding papers of pure cellulose. It is noted however, that papers with a high content of sizing and which have consequently less absorption power may easily be over-saturated with silicic acid. If the saturation limit is overstepped silica gel is formed on the surface and a stiff structure is formed which is brittle in spite of a suitable control of the pH during saturation and drying. The most suitable papers are therefore those with none or limited amounts of sizing, which can absorb 200–300% by weight of water. Such papers remain useful for filtration purposes even when they are modified with 40–100% $SiO_2$, calculated by weight of cellulose.

EXAMPLE 3 (textiles).

The silicic acid solution of Example 2 with acetone-pyrosulphite buffer was used for impregnation of various textiles.

A. A fine cotton weave was saturated with the solution diluted to 100 g/l $SiO_2$ and dried. The pH sequence was the same as for paper. The fabric increased 15% in weight. Improvement were noted in pleat retention during several washings, good crease recovery, improved soil resistance and, finally, improved wear resistance.

B. A fine weave of rayon filament was treated. The best results were achieved with a concentration of 75 g/l $SiO_2$. Wet properties were very much improved. In wet condition the fabric behaved as a polyester fiber with good resilience and elasticity.

C. A coarse weave rayon (6–10d.tex.) was also impregnated. In this case oversaturation occurred, due to the fact that the coarse rayon did absorb only limited amounts of water and silicic acid. The concentration of the impregnation solution therefore had to be reduced to 50 g/l $SiO_2$. As a result little or no silica could be brushed from the fabric. The fabric which was an upholstery fabric changed character, so that it appeared as being a woolen fabric. Further, wet properties, wear properties and soil resistance were very much improved.

D. A fine fabric of cellulose acetate was treated and dried. The impregnation solution could contain 100–125 g/l $SiO_2$ without giving any signs of loose silica. The fiber accepted up to 12% $SiO_2$ and was very glossy under the microscope without any signs of silica particles. The characteristics of the acetate had changed, however resembling natural silk both with respect to touch and to lustre. Wet properties and wear strength were much improved. The fabric did not melt on burning. All the fabrics A–D were stored partially dried but still wet after impregnation for three days. Then they were treated with a diluted 5% emulsion of polyethylacrylate. The result was in all cases very stable but soft fabrics with surprisingly improved soil resistance. By way of comparison, the original fabrics when treated in the same way with latices but, without silicic acid treatments, had an unpleasant plastic feel and a strong tendency to soil due to their tacky surfaces.

EXAMPLE 4

In order to elucidate the function of silicic acid modification of cellulose sheets the following tests were made: Bleached sulfate cellulose was impregnated with a solution of monomer and oligomer silicic acid in a concentration corresponding to 100 g $SiO_2$ per liter at pH 1.9. The solution was practically free of salts since the sodium sulfate by-products was crystallized and filtered off at $-1°$ C. The silicic acid oligomers were allowed to polycondensate at ambient temperature, and the $SiO_2$-content based on cellulose was 15%. The product was kept wet for a month. (After 12 hours more than 90% of the silicic acid could be washed out by water. After 3 days, there was no sign of soluble silicic acid.)

After a month the wet sample was desintegrated in a pulper (laboratory) and paper 90 g/m² formed. The paper was not especially strong having a dry strength of 1,200 m and a wet strength of 200 m. Dry tear strength was 3% single sheet. The dry paper was then treated with a silicic acid solution of the same type and concentration as above but with aceton sulfite complex bringing the pH to 4.5 and dried a second time. Dry strength was now 2,500 m and wet strength 450 m. Dry tear strength had increased to 7% single sheet.

Then a new paper was formed from the same modified cellulose pulp with 15% $SiO_2$, but this time a new solution of silicic acid was added before the paper had dried in order to visualize the action of new silicic acid solution on the old cellulose-silicic acid structure before its drying. The finished paper dry strength now increased to 5,000 m and wet strength to 2,500 m. Dry tear strength increased to 15% single sheet. In both cases the final $SiO_2$-content was around 50%.

From these tests it is obvious that the new added silicic acid is more effective as a binder, when it is allowed to combine with the cellulose-polysilicic acid structure before its drying as compared with after its drying. The cellulose-polysilicic acid structure is more accessible for binding before and during drying than it is after being dried once.

EXAMPLE 5

The sulfate cellulose modified with 15% $SiO_2$ and prepared according to description in the foregoing example was chosen as raw material for a textile like paper or non-woven.

The modified cellulose was desintegrated in a laboratory pulper and to the resulting pulp a polyethylacrylate emulsion HAS from Rohm and Haas (Philadelphia) was added in an amount corresponding to 25% solid polymer based on the weight of cellulose. Al-sulfate in an amount of 20% crystallized product based on weight of polymer (ethylacrylate) was also added to the pulp. Together with this modified fiber the added Al-sulfate caused a total precipitation of latex material on the fiber. If regular cellulose without silicic acid modification is used it is hardly possible to precipitate this nonionic latex and about 200% crystalline Al-sulfate is required for a partial precipitation.

A paper sheet was formed of the resulting pulp with a dry weight of 90 g/m². In spite of the fact that the sheet did not contain any long textile fibers or rayon, the sheet showed a significant soft textile character. The sheet was, after drying, heated to 140° C in 5 minutes in order to cure the acrylate resin. Byside soft textile properties and a dry non-plastic feeling the sheet was easily wetted — a typical character for silicic acid modified cellulose. The tensil strength corresponded to 5,000 m dry and 2,400 m wet. The textile character is a combination of softness with a dry tear strength of 24% single sheet, a figure that is difficult to achieve in non-wovens containing more than 50% long textile fibers.

For comparison a corresponding sheet was formed of regular unmodified cellulose of the same origin as above. The only difference in preparation was that 200% crystallized Al-sulfate had to be added to get a reasonable precipitation of the latex. The dry strength now only corresponded to 1,800 m and wet strength to 300 m. The dry tear strength was 8% single sheet. Compared with the previous sample, this one was not readily wetted by water and showed a slow water penetration.

EXAMPLE 6

The same modified cellulose with 15% SiO$_2$ was pulped and to the stock was added Dow latex (SER) 636 (anionic) in an amount corresponding to 100% dry rubber based on weight of modified fiber. As the silicic acid modified fiber is slightly acidic, the latex was evenly precipitated on the fiber and a small addition of Al-sulfate was sufficient to precipitate the latex.

In spite of the high content of latex material a smooth sheet was prepared in the laboratory paper sheet former. The weight of the sheet corresponded to 175 g/m$^2$. It was soft but had a tensile strength corresponding to 8,000 m. Dry tear strength corresponded to 20% single sheet. In spite of the high content of elastomer the sheet had a very dry feel and a very good elasticity and stretchability.

A sample made for comparison of pure cellulose was too tacky and was very difficult to form into a satisfactory sheet. The silicic acid structure is very efficient in hiding the tacky properties of elastomers as well as of plastics used as binders.

EXAMPLE 7

A similar well aged sample of modified cellulose as in the previous examples but now with 20% SiO$_2$ on a cellulose weight bases was pulped and mixed with 7 times its weight of portland cement. The stock was dewatered and pressed to 3 mm thick "eternite"-sheets. After 20 days of curing some properties were tested in comparison with a corresponding sample containing asbestos instead of modified cellulose, however in the latter case only 6 times the weight of fibers were added as portland cement, due to the difference in fiber volume and density.

The most significant differences in properties were that the modified cellulose eternite had 30% less bending strength but three times of the shock resistance of the asbestos eternite. This combination of properties indicate a very interesting product having reduced brittleness. One drawback may be a higher degree of water absorption, but resistance to freezing was not decreased.

I claim:

1. A composition comprising cellulose fibers, polysilicic acid, and a binder material, said cellulose fibers and polysilicic acid forming a cellulose polysilicic acid capillary structure having an internal capillarity corresponding to a BET-surface of 200–800 m$^2$/g polysilicic acid by absorbing a water based solution of monomer and oligomer silicic acids having a pH of between 1 and 5 into said cellulose fibers and polycondensating said monomer and oligomer silicic acids, and said binder material being adhered to said capillary structure.

2. The composition of claim 1 in which said solution of monomer and oligomer silicic acids has a pH of between 1.5 and 3.0.

3. The composition of claim 1 in which the amount of silicic acid incorporated in said cellulose-polysilicic acid structure is equal to 2–100% based on the weight of cellulose fibers.

4. The composition of claim 3 in which the amount of silicic acid incorporated in said cellulose-polysilicic acid structure is equal to 8–40% as SiO$_2$ based on the weight of cellulose fibers.

5. A composition according to claim 1 in which the cellulose fibers are selected from the group consisting of wood cellulose, sulfite cellulose, sulfate-craft cellulose, semi-chemical cellulose, mechanical pulp cellulose, cotton and vegetable cellulose, regenerated cellulose and cellulose esters.

6. A composition according to claim 1 in which the binder is selected from the group of plastic binders consisting of polyacrylates, polyvinylacetates, polyvinylchlorides and copolymers, polyesters, nylon polymers, and polyacrylonitrile polymers.

7. A composition according to claim 1 in which the binder is selected from the group of elastomers consisting of styrene-butadiene polymers, polybutadienes, and polychloroprenes.

8. The composition of claim 1 in which the binder is selected from a group of inorganic hydraulic binders consisting of cement, gypsum, and alkaline silicates and aluminates.

9. A composition comprising cellulose fibers, polysilicic acid and a buffering acid, said buffering acid having a pK between 2 and 6 and which is decomposable upon drying to form a less acidic residue, and said cellulose fibers and polysilicic acid forming a cellulose-polysilicic acid capillary structure having an internal capillarity corresponding to a BET-surface of 200–800 m$^2$/g polysilicic acid.

10. The composition of claim 9 in which said buffering acid is selected from the group of acids consisting of complex acids of acidic sulphites and acetones, ketones and aldehydes.

11. The method of manufacturing compositions of cellulose fibers and a binder material comprising the following steps:

a. Impregnating cellulose fibers with a water base solution of monomer and oligomer silicic acids at a pH of 1–5 and having a silicic acid concentration of 3–15% calculated as SiO$_2$;

b. Polycondensating the monomer and oligomer silicic acid absorbed by the cellulose to form a hydrated cellulose-polysilicic acid structure which is insoluble in water;

c. Adding the binder while the cellulose-polysilicic acid structure is hydrated;

d. Drying the composition to form a cellulose-polysilicic acid structure having an internal capillary structure with a BET-surface of 200–800 m$^2$/g silicic acid in which the binder is adhered.

12. The method of claim 11 in which said water base silicic acid solution is a pH of 1.5–3.0.

13. The method of manufacturing compositions of cellulose fibers and a binder material comprising the steps of:

a. Impregnating cellulose fibers in the form of cellulose sheets wiith a water base solution of monomer and oligomer silicic acids at a pH of 1–5 and having a silicis acid concentration of 3–15% calculated as SiO$_2$;

b. Adding a buffering acid having a pK value of between 2 and 6 and which is decomposable to a less acidic residue upon drying;

c. Drying the impregnated cellulose sheet to polycondensate the silicic acid monomers and oligomers to form a hydrated cellulose-polysilicic acid capillary structure into which excess monomer and oligomer silicic acid is adhered as a binding material.

14. The method of claim 13 in which acid monomer and oligomer silicic acid solution is at a pH between 1.5 and 3.

15. The method of claim 13 in which said buffering acid is an acid complex formed by acidic sulfites and acetones.

* * * * *